United States Patent
Beals

(10) Patent No.: US 9,544,626 B2
(45) Date of Patent: *Jan. 10, 2017

(54) USE OF TELEVISION SATELLITE SIGNALS TO DETERMINE LOCATION

(71) Applicant: EchoStar Technologies, L.L.C., Englewood, CO (US)

(72) Inventor: William Michael Beals, Englewood, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/958,658

(22) Filed: Dec. 3, 2015

(65) Prior Publication Data

US 2016/0127752 A1 May 5, 2016

Related U.S. Application Data

(63) Continuation of application No. 13/962,198, filed on Aug. 8, 2013, now Pat. No. 9,231,718.

(51) Int. Cl.
| | |
|---|---|
| H04N 7/20 | (2006.01) |
| H04N 21/258 | (2011.01) |
| H04H 60/51 | (2008.01) |
| H04H 40/90 | (2008.01) |
| H04N 21/426 | (2011.01) |
| H04N 21/61 | (2011.01) |
| H04W 4/02 | (2009.01) |

(52) U.S. Cl.
CPC ........ *H04N 21/25841* (2013.01); *H04H 40/90* (2013.01); *H04H 60/51* (2013.01); *H04N 21/4263* (2013.01); *H04N 21/6143* (2013.01); *H04W 4/025* (2013.01); *H04H 2201/60* (2013.01)

(58) Field of Classification Search
USPC .............................................. 725/68; 726/68
See application file for complete search history.

(56) References Cited

U.S. PATENT DOCUMENTS

| | | | |
|---|---|---|---|
| 6,266,813 B1 | 7/2001 | Ihara | |
| 6,741,834 B1 * | 5/2004 | Godwin | ............... H04H 20/103 348/E5.105 |
| 7,831,659 B2 | 11/2010 | Endo | |

(Continued)

FOREIGN PATENT DOCUMENTS

EP          2 227 006 A1      8/2010

OTHER PUBLICATIONS

European Search Report for EP14198736 dated Mar. 13, 2015, all pages.

(Continued)

*Primary Examiner* — Mushfikh Alam
(74) *Attorney, Agent, or Firm* — Kilpatrick Townsend & Stockton LLP

(57) ABSTRACT

Various arrangements are directed to locating a television receiver. Multiple tuners of the television receiver may be simultaneously tuned to different television distribution satellites to receive timing signals. Using these timing signals, the location of the television receiver may be determined. Based on a comparison between a stored, expected location of the television receiver and the determined location, the functionality of the television receiver may be adjusted.

9 Claims, 7 Drawing Sheets

(56) References Cited

U.S. PATENT DOCUMENTS

| | | | |
|---|---|---|---|
| 8,887,307 B2* | 11/2014 | Chen | H04L 9/3271 713/169 |
| 9,231,718 B2 | 1/2016 | Beals | |
| 2003/0145328 A1* | 7/2003 | Rabinowitz | G01S 5/0036 725/72 |
| 2005/0204389 A1 | 9/2005 | Proehl | |
| 2006/0253877 A1 | 11/2006 | Hsu | |
| 2007/0180231 A1 | 8/2007 | Morten | |
| 2008/0178226 A1* | 7/2008 | Lee | H04W 48/16 725/68 |
| 2009/0070828 A1* | 3/2009 | Stomakhin | H04N 7/165 725/68 |
| 2009/0160939 A1* | 6/2009 | Fernandez | G08B 13/19608 348/158 |
| 2009/0296000 A1 | 12/2009 | Pal | |
| 2011/0047584 A1 | 2/2011 | Codadeen | |
| 2011/0055862 A1* | 3/2011 | Harp | H04N 7/17318 725/25 |
| 2012/0131611 A1* | 5/2012 | Yeap | H04N 21/42202 725/35 |
| 2012/0204212 A1 | 8/2012 | Lester et al. | |
| 2013/0065610 A1* | 3/2013 | Attar | G01S 5/0205 455/456.1 |
| 2013/0201059 A1 | 8/2013 | Wengler et al. | |
| 2013/0232565 A1* | 9/2013 | O'Connor | H04B 7/18584 726/13 |
| 2014/0068778 A1* | 3/2014 | Bhatia | H04W 4/02 726/26 |
| 2014/0282714 A1 | 9/2014 | Hussain | |
| 2014/0325551 A1* | 10/2014 | McMillan | H04N 21/25841 725/20 |
| 2015/0046952 A1 | 2/2015 | Beals | |
| 2015/0189379 A1 | 7/2015 | Swenson | |

OTHER PUBLICATIONS

U.S. Appl. No. 13/962,198 filed Aug. 8, 2013 Notice of Allowance mailed Oct. 6, 2015, all pages.

U.S. Appl. No. 13/962,198 filed Aug. 8, 2013 Non-Final Rejection mailed May 12, 2015, all pages.

U.S. Appl. No. 13/962,198 filed Aug. 8, 2013 Non-Final Rejection mailed Nov. 6, 2014, all pages.

U.S. Appl. No. 14/532,398 Non Final Office Action mailed Nov. 4, 2015, all pages.

U.S. Appl. No. 14/532,398 Non Final Office Action mailed Apr. 28, 2016, all pages.

* cited by examiner

USE OF TELEVISION SATELLITE SIGNALS TO DETERMINE LOCATION

CROSS-REFERENCE TO RELATED APPLICATIONS

This application claims priority to U.S. patent application Ser. No. 13/962,198, filed Aug. 8, 2013 and entitled USE OF TELEVISION SATELLITE SIGNALS TO DETERMINE LOCATION, which is hereby incorporated by reference for all intents and purposes.

BACKGROUND

Satellite television service allows for delivery of a large volume of content (e.g., television channels, on-demand content) to subscribers' locations via satellite. While use of a satellite-based distribution architecture avoids the need of a wired infrastructure, satellite-based broadcasts can increase the likelihood of subscription-based services being surreptitiously obtained. For example, a person providing a false address for use of a television receiver may allow the person to acquire services they would otherwise not be entitled to use at the television receiver.

For this reason and/or possibly others, it may be useful for a television receiver to be able to determine its own location.

SUMMARY

In some embodiments, a television receiver configured to perform self-location. The television receiver may include a plurality of tuners, wherein each tuner of the plurality of tuners is configured to be tuned to a plurality of transponders of a plurality of television distribution satellites. The television receiver may include one or more processors. The television receiver may include a memory communicatively coupled with and readable by the one or more processors and having stored therein processor-readable instructions which, when executed by the one or more processors, cause the one or more processors to tune a first tuner of the plurality of tuners to receive signals from a first television distribution satellite of the plurality of television distribution satellites. The processor-readable instructions may further cause the one or more processors to tune a second tuner of the plurality of tuners to receive signals from a second television distribution satellite of the plurality of television distribution satellites, wherein the second tuner is tuned to the second television distribution satellite simultaneously with the first tuner being tuned to the first television distribution satellite. The processor-readable instructions may further cause the one or more processors to receive a first timing signal via the first tuner and a second timing signal via the second tuner. The processor-readable instructions may further cause the one or more processors to, based upon the received first and second timing signals, calculate a location region of the television receiver.

Embodiments of such a television receiver may include one or more of the following features: The processor-readable instructions may further cause the one or more processors to analyze a first television signal broadcast by the first television distribution satellite as a spot beam, wherein the spot beam is targeted to a first geographic region. Calculation of the location region of the television receiver may be further based on the first geographic region targeted by the spot beam. The first timing signal may be received as part of a transponder stream comprising a plurality of television channels. The processor-readable instructions may further cause the one or more processors to tune a third tuner of the plurality of tuners to receive signals from a third television distribution satellite of the plurality of television distribution satellites, wherein the third tuner is tuned to the third television distribution satellite simultaneously with the first tuner being tuned to the first television distribution satellite. The processor-readable instructions may further cause the one or more processors to receive a third timing signal via the third tuner, wherein calculating the location region of the television receiver is based on the third timing signal. The processor-readable instructions may further cause the one or more processors to compare the calculated location region of the television receiver to an approved location of the television receiver. The processor-readable instructions may further cause the one or more processors to determine if the calculated location region of the television receiver matches the approved location of the television receiver to within a threshold distance. The processor-readable instructions may further cause the one or more processors to, in response to determining the calculated location region of the television receiver does not match the approved location of the television receiver to within the threshold distance, modify functionality of the television receiver to output television channels. The television receiver may include a smartcard reader. The memory may further include processor-readable instructions, which, when executed by the one or more processors, cause the one or more processors to retrieve the approved location of the television receiver from a smartcard accessible to the smartcard reader.

The first timing signal and the second timing signal may be synchronized such that each is broadcast to the television receiver at a same time. The processor-readable instructions may further cause the one or more processors to output a television channel received via the first tuner from the first television distribution satellite to a display device, wherein the first television distribution satellite is in geosynchronous orbit.

In some embodiments, a method for a television receiver to perform self-location may be presented. The method may include tuning a first tuner of a plurality of tuners of the television receiver to receive signals from a first television distribution satellite of a plurality of television distribution satellites. The method may include tuning a second tuner of the plurality of tuners to receive signals from a second television distribution satellite of the plurality of television distribution satellites, wherein the second tuner is tuned to the second television distribution satellite simultaneously with the first tuner being tuned to the first television distribution satellite. The method may include receiving a first timing signal via the first tuner of the television receiver and a second timing signal via the second tuner of the television receiver. The method may include, based upon the received first and second timing signals, calculating, by the television receiver, a location region of the television receiver.

Embodiments of such a method may include one or more of the following features: The method may include analyzing a first television signal broadcast by the first television distribution satellite as a spot beam, wherein the spot beam is targeted to a first geographic region. The method may include calculating the location region of the television receiver is further based on the first geographic region targeted by the spot beam. The first timing signal may be received as part of a transponder stream comprising a plurality of television channels. The method may include tuning a third tuner of the plurality of tuners to receive signals from a third television distribution satellite of the plurality of television distribution satellites, wherein the third tuner is tuned to the third television distribution satellite simultaneously with the first tuner being tuned to the first television distribution satellite. The method may include receiving a third timing signal via the third tuner, wherein calculating the location region of the television receiver is based on the third timing signal. The method may include comparing the calculated location region of the television receiver to an approved location of the television receiver. The method may include determining if the calculated location region of the television receiver matches the approved location of the television receiver to within a threshold distance. The method may include, in response to determining the calculated location region of the television receiver does not match the approved location of the television receiver to within the threshold distance, modifying functionality of the television receiver to output television channels. The method may include retrieving the approved location of the television receiver from a smartcard accessible to a smartcard reader of the television receiver. The method may include broadcasting the first timing signal from the first television distribution satellite and the second timing signal from the second television distribution satellite such that the first timing signal and the second timing signal is broadcast to the television receiver at a same time from separate satellites. The method may include outputting a television channel received via the first tuner from the first television distribution satellite to a display device, wherein the first television distribution satellite is in geosynchronous orbit.

In some embodiments, a non-transitory processor-readable medium for performing self-location of a television receiver may be presented. The processor-readable instructions may be configured to cause one or more processors to tune a first tuner of a plurality of tuners of the television receiver to receive signals from a first television distribution satellite of a plurality of television distribution satellites. The processor-readable instructions may be configured to cause the one or more processors to tune a second tuner of the plurality of tuners to receive signals from a second television distribution satellite of the plurality of television distribution satellites, wherein the second tuner is tuned to the second television distribution satellite simultaneously with the first tuner being tuned to the first television distribution satellite. The processor-readable instructions may be configured to cause the one or more processors to receive a first timing signal via the first tuner and a second timing signal via the second tuner. The processor-readable instructions may be configured to cause the one or more processors to, based upon the received first and second timing signals, calculate a location region of the television receiver. In some embodiments, the processor-readable instructions may be configured to cause the one or more processors to analyze a first television signal broadcast by the first television distribution satellite as a spot beam, wherein the spot beam is targeted to a first geographic region. Calculation of the location region of the television receiver may be further based on the first geographic region targeted by the spot beam.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
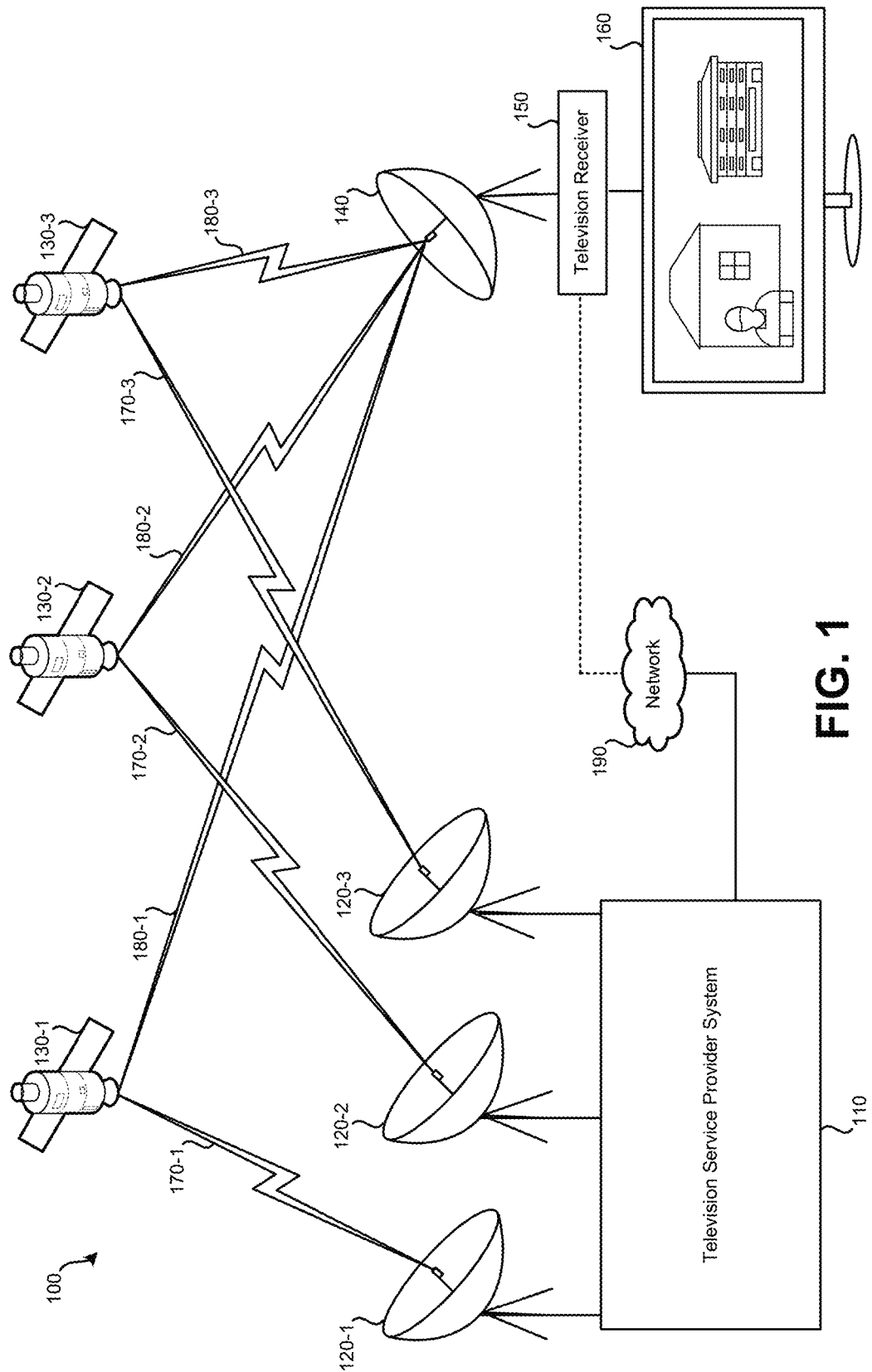
FIG. 1 illustrates an embodiment of a television distribution system.

By distributing content, such as television channels, to subscribers via satellite, it may be possible for the content to be pirated. For instance, a signal pirate can surreptitiously capture signals broadcast from the satellite, decrypt and/or descramble the signals, and watch and/or record broadcast content without paying the full subscription fee to the television service provider. One type of piracy involves creating a legitimate subscription account with a satellite-based television service provider and obtaining a number of legitimate television receivers (and, possibly, smartcards). Typically, a subscription account can legitimately be linked with multiple television receivers for use within a single household (or other single location) of the subscriber. Further, in many instances, the greater the number of television receivers installed in a household, the lower the subscription cost becomes per television receiver. Piracy may occur by geographically-scattered persons (e.g., persons living in different households) obtaining a single subscription account for multiple television receivers. Each of these geographically-scattered pirates may use a television receiver associated with the account at the pirate's own location rather than in the single household associated with the subscription account. Such a form of piracy may be difficult to detect due to each pirate operating a television receiver that was legitimately obtained.

By providing a television receiver the ability to determine its own location, the television receiver may be able to determine if it is likely located in at least the general geographic region of the address associated with the subscription account. If the television receiver determines it is located greater than a threshold distance from the address associated with the subscription account, this may be an indication that the television receiver is part of a signal piracy scheme. In such instances, functionality of the television receiver may be blocked, restricted, impeded, or otherwise negatively-impacted to discourage piracy and encourage the purchase of legitimate subscriptions.

While the above description details a possible reason as to why the position of a television receiver may be determined, it should be understood that the arrangements detailed herein for determining the location of a television receiver may be used for reasons in addition to or instead of detecting signal piracy.

Typically, in a satellite-based television distribution system, there may be no accurate way of determining a location of a television receiver if the television receiver is not connected to a network or other communication network. As such, a signal pirate may intentionally keep his television receiver disconnected from the Internet and/or a phone network so that the television service provider is unable to determine if the television receiver is located at the address associated with the subscription account.

In order to determine the location of a television receiver, the television receiver may use the timing of signals received from multiple television distribution satellites to determine its own location. A television receiver can receive content (e.g., television channels and other forms of content) from multiple transponders located on multiple satellites. Trilateration may be performed using signals received from three of these television distribution satellites. Therefore, the television receiver may tune a separate tuner to each of the television distribution satellites such that signals are received from each of the satellites at a same time. In some embodiments, a less precise location of the television receiver may be determined using timing signals from only two satellites (which may indicate a band in which the television receiver is present). A timing signal may be broadcast by each of the television distribution satellites at a same time. Based upon measuring when these timing signals are received by the television receiver, the television receiver can determine a difference in distance between the television receiver and the known locations of the television distribution satellites. Using these differences in distance, the location of the television receiver can be determined.

Due to factors such as the television distribution satellites possibly being in geosynchronous orbit, the television distribution satellites may each have different, but similar distances to the television receiver. Therefore, a location determined using the time difference of arrival values may have a significant amount of error. To further refine the location of the television receiver, additional signal measurements may be made. Certain television channels are transmitted to television receivers as spot beams. Such a spot beam may be targeted to a particular geographic region, such as a particular television market (e.g., the Boston area). Whether a particular spot beam television signal can be received by a television receiver may be used to refine the location of the television receiver determined using the timing measurements to the television distribution satellites. Further, a measured signal strength of the spot beam signal (possibly as compared to the signal strength of a non-spot beam signal transmitted by the same satellite) may be used to further refine where the television receiver is likely located within the spot beam.

The television receiver may have a stored indication of an address associated with a subscription account. If the television receiver is being used in accordance with the subscription, the television receiver should be located at the address. When a subscriber initially agrees to have an account with the satellite-based television service provider, the subscriber may provide an address at which the television receiver is intended to be installed. This address or coordinates associated with this address may be stored to a smart card, which is or will be installed within the television receiver to be used by the subscriber. After the television receiver and smart card are installed, the television receiver may perform self-location. If the television receiver determines it is within a threshold distance of the coordinates of the address, the television receiver may operate in accordance with the subscription. If the television receiver determines it is located farther than a threshold distance of the coordinates of the address, the television receiver may impede, block, or otherwise restrict use. For example, a pop-up may be displayed that requires the user to contact the television service provider. If, after a period of time, the user has not addressed the pop-up message, the television receiver may be fully disabled.

FIG. 1 illustrates an embodiment of a satellite television distribution system 100. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions) instances of user equipment may receive television signals from satellites 130.

Television service provider system 110 and satellite transmitter equipment 120 may be operated by a television service provider. A television service provider may distribute television channels, on-demand programming, programming information, and/or other content/services to users. A television service provider may also distribute timing signals for use in location determination. The timing signals may be dedicated for use in location determination, or may be in the form of a signal that is broadcast as part of the distribution of television channels/programming. Timing signals may be synchronized such that the timing signals are transmitted from multiple television distribution satellites at a same time. Timing signals may also be synchronized by providing television receivers with a timing offset value that indicates a delay between when different satellites transmit timing signals. Rather than providing dedicating timing signals, television service provider system 110 may synchronize signals related to television channel or content distribution for use in location determination. For example, the broadcast of data (e.g., television programming streams) using QPSK (quadrature phase-shift keying) or ASK (amplitude-shift keying) may be used in place of dedicated timing signals. The timing information, for example may be noted by a specific and uniquely identifiable data pattern in the data stream that can be recognized as part of the demodulation process. This could, for example, be the start of an MPEG picture start code in an MPEG transport packet, or any other such well-defined signal that occurs on a regular basis (but infrequent enough to ensure that it is clear which signals to compare for TDOA measurements). The nature of the error detection/correction process used to demodulate the data may require recognizing the data before the demodulation is complete.

Television service provider system 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via multiple television distribution satellites. Each satellite may relay multiple transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 (e.g., satellite transmitter equipment 120-1, 120-2, and 120-3) may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. The relayed data may include timing signals to be used to determine positioning of television receivers. Different frequencies may be used for uplink signals 170 (170-1, 170-2, and 170-3) from transponder streams 180 (180-1, 180-2, and 180-3). Further, more than one transponder stream may be transmitted by each satellite of satellites 130. Satellites 130 may be in geosynchronous orbit. Each satellite 130 may be in a different orbital slot, such that the signal paths between each satellite, transmitter equipment, and user equipment vary. Therefore, a different distance exists between each satellite and each instance of user equipment. While satellites 130 may be geosynchronous orbit, each satellite's location may vary within an orbital slot (e.g., via minor location adjustments made via satellite thrusters). Data may be transmitted to a television receiver (e.g., via a transponder stream) that indicates a location of each satellite to be used for location determination. This data may be the current locations of the satellites or may be data sufficient for the television receiver to calculate the locations of the satellites. The amount of time a signal will take to travel from each satellite to the user equipment will vary. Since the location of the satellites is known, the difference between the amounts of time a synchronized timing signal takes to reach a television receiver from at least two television distribution satellites may be used to determine the television receiver's location. Timing signals from three television distribution satellites may provide a more refined location of the television receiver.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Multiple television channels on a same transponder stream may be multiplexed together such that data packets corresponding to each television channel are interspersed and are received as part of a serial data stream.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite transmitter equipment 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite.

Typically, television receiver 150 is located near satellite dish 140, with a connection existing via one or more wires (e.g., coaxial cable). Determining the location of television receiver 150 may, more accurately, be characterized as determining the location of satellite dish 140, which initially captures timing signals from multiple television distribution satellites. The location of television receiver 150 may be approximated using the location of satellite dish 140 because television receiver 150 can be expected to be nearby (e.g., within 500 feet) of satellite dish 140. Within this document, locating a television receiver may be considered shorthand for locating the satellite dish 140 with which the television receiver is communicatively coupled.

Figure 2:
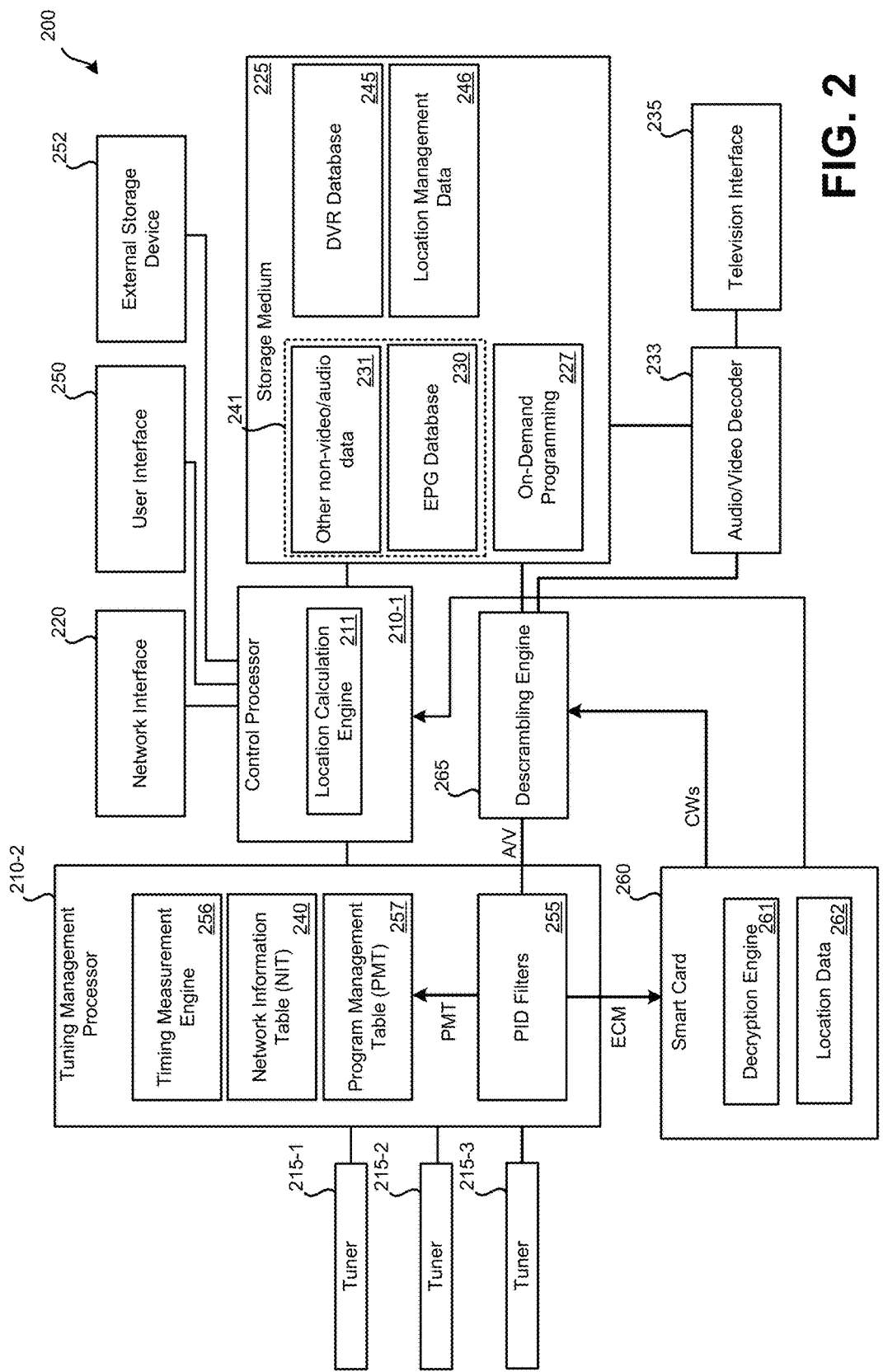
FIG. 2 illustrates an embodiment of a television receiver.

In communication with satellite dish 140 may be one or more sets of receiving equipment. Receiving equipment may be configured to decode signals received from satellites 130 via satellite dish 140 for display on a display device, such as display device 160. Receiving equipment may also decode audio and/or non-audio/video data. Receiving equipment may be incorporated as part of a television or may be part of a separate device, commonly referred to as a set-top box (STB). Receiving equipment may include multiple satellite tuners configured to receive television channels via a satellite. In FIG. 1, receiving equipment is present in the form of television receiver 150. As such, television receiver 150 may decode signals received via satellite dish 140 and provide an output to display device 160. FIG. 2 provides additional detail of a television receiver. A television receiver is defined to include set-top boxes (STBs) and also circuitry having similar functionality that may be incorporated with another device. For instance, circuitry similar to that of a television receiver may be incorporated into a television. As such, while FIG. 1 illustrates an embodiment of television receiver 150 as separate from display device 160, it should be understood that, in other embodiments, similar functions may be performed by a television receiver integrated with display device 160.

Display device 160 may be used to present video and/or audio decoded by television receiver 150. Television receiver 150 may also output a display of one or more interfaces to display device 160, such as an electronic programming guide (EPG). In some embodiments, a display device other than a television may be used. Display device 160 may be a television, monitor, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a first group of television channels, while uplink signal 170-2 contains a second group of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal between satellite 130-2 and satellite dish 140. Each of transponder streams 180 may contain one or more different television channels, which may be at least partially scrambled. For example, transponder stream 180-1 may be a first transponder stream containing a first group of television channels, while transponder stream 180-2 may be a second transponder stream containing a different group of television channels.

Each of transponder streams 180 may also contain synchronized timing signals. A satellite may transmit multiple transponder streams to user equipment. For example, a typical satellite may relay thirty-two transponder streams via corresponding transponders to user equipment. In some embodiments, timing signals for use in locating a television receiver may only be broadcast on a subset (e.g., one or more) of transponders of a particular satellite. For instance, multiple transponders of the same satellite could not be used to locate a television receiver since the transponders are located too close together. Rather, transponders on different satellites (which would be many miles apart) would be used.

Some or all of satellites 130 may be configured to transmit spot beams. A spot beam may allow a satellite to transmit a transponder stream to a particular geographic region (e.g., to distribute local television channels to the relevant television market). A spot beam is directed to a smaller geographic region than a non-spot beam. For instance, a first transponder that is a spot beam may be directed to provide a transponder stream to the greater-Boston area, while a non-spot beam may be directed to provide another transponder stream to the contiguous forty-eight states. Different television channels may be transmitted using the same frequency of the transponder stream to different geographic regions. Therefore, a particular frequency can be reused for different spot beams directed to different geographic regions. For example, a spot beam targeted to the greater San Francisco area may use a same frequency as a spot beam targeted to the greater Chicago area since the geographical regions do not overlap.

FIG. 1 illustrates transponder stream 180-1, transponder stream 180-2, and transponder stream 18-3 being received by satellite dish 140 and distributed to television receiver 150. For a first group of television channels, satellite dish 140 may receive transponder stream 180-1; for a second group of channels, transponder stream 180-2 may be received; and for a third group of television channels, transponder stream 180-3 may be received. In addition to television programming, these transponder streams may include timing signals for use in location determination by television receiver 150. Television receiver 150 may decode the received transponder streams. As such, depending on which television channels are desired to be received (or which satellites are to be used for location determination), various transponder streams from various satellites may be accessed and decoded by television receiver 150. For location determination, at least two satellites may be simultaneously tuned to. While three satellites are present in satellite television distribution system 100, in other embodiments greater numbers of satellites (or two satellites) may be present for receiving and transmitting transponder streams to user equipment.

Network 190 may serve as a secondary communication channel between television service provider system 110 and television receiver 150. However, in many instances, television receiver 150 may be disconnected from network 190 (for reasons such as because television receiver 150 is not configured to connect to network 190, or a subscriber does not desire or cannot connect to network 190). As such, the connection between network 190 and television receiver 150 is represented by a dotted line. Via such a secondary communication channel, bidirectional exchange of data may occur. As such, data may be transmitted to television service provider system 110 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190. When television receiver 150 is disconnected from network 190, it may still be possible for television receiver 150 to perform self-location based on signals received from multiple television distribution satellites.

FIG. 2 illustrates an embodiment of television receiver 200, which may typically be in the form of a separate device configured to be connected with a presentation device, such as a television. Embodiments of television receiver 200 may include set top boxes (STBs). As previously noted, in addition to being in the form of an STB, a television receiver may be incorporated into another device, such as a television. For example, a television may have an integrated television receiver (which does not involve an external STB being coupled with the television). An STB may contain some or all of the components of television receiver 200 and/or may be able to perform some or all of the functions of television receiver 200. Accordingly, instances in this document referring to an STB and steps being performed by an STB may also be performed, more generally, by a television receiver.

Television receiver 200 may be the television receiver of FIG. 1 and may be in the form of an STB that communicates with a display device such as a television. Television receiver 200 may be incorporated as part of a television, such as display device 160 of FIG. 1. Television receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, television interface 235, networking information table (NIT) 240, digital video recorder (DVR) database 245 (which may include provider-managed television programming storage and/or user-defined television programming), on-demand programming 227, user interface 250, external storage device 252, smart card 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID filters 255 may be handled by separate hardware from program management table 257.

Processors 210 may include one or more specialized and/or general-purpose processors configured to perform processes such as tuning to a particular channel, analyzing timing signals, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. Control processor 210-1 may provide a command to tuning management processor 210-2 that indicates when a location of television receiver 200 is to be determined. In addition to providing commands relating to the recording of television channels, control processor 210-1 may provide commands to tuning management processor 210-2 that indicate television channels to be output to audio/video decoder 233 for output to a presentation device, such as a television. Control processor 210-1 may also communicate with network interface 220 and user interface 250. Control processor 210-1 may handle incoming data from network interface 220 and user interface 250. Additionally, control processor 210-1 may be configured to output data via network interface 220.

Control processor 210-1 may contain a location calculation engine 211. Control processor 210-1 may instruct tuning management processor 210-2 when a location measurement is to be performed. One condition for a location measurement may be that a sufficient number of tuners of tuners 215 are available such that at least two different satellites may be tuned to at the same time. Location calculation engine 211 uses timing data measured by timing measurement engine 256 to determine a location of television receiver 200. Accordingly, location calculation engine 211 may use time difference of arrival (TDOA) values and known locations of television satellites to determine a location of television receiver 200. Further, analysis of which spot beams and the signal strength of such spot beams may be used by location calculation engine 211 to refine the location of the television receiver. In some embodiments it should be understood that location determination of the television receiver may only be accurate enough to determine a geographic region in which the television receiver is located. While location calculation engine 211 is illustrated as a subcomponent of control processor 210-1, it should be understood that the functionality of location calculation engine 211 may alternatively be performed by another component of television receiver 200, such as tuning management processor 210-2.

Tuners 215 may include one or more tuners used to tune to transponders that include broadcasts of one or more television channels. Further, tuners 215 may be used to receive timing signals from television distribution satellites. In the illustrated embodiment of television receiver 200, three tuners are present (tuner 215-1, tuner 215-2, and tuner 215-3). In other embodiments, two or more than three tuners may be present, such as four, six, or eight tuners. Each tuner contained in tuners 215 may be capable of receiving and processing a single transponder stream from a satellite transponder at a given time. As such, a single tuner may tune to a single transponder at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be used for tuning.

If timing signals are to be received for determining a location of television receiver 200, at least two of tuners 215 may be instructed to tune to transponder streams being emitted from different satellites. For instance, network information table 240 may be consulted by tuning management processor 210-2 to identify two or more transponder streams that are each broadcast to the television receiver via a different satellite. The timing signals may be transmitted among television programming signals on transponder streams. Tuning management processor 210-2 may instruct tuners 215 as to the appropriate frequency to which to tune to receive transponder streams from different television distribution satellites.

Network interface 220 may be used to communicate via an alternate communication channel with a television service provider, if such communication channel is available. If a pirate is attempting to use television receiver 200 for signal piracy, a pirate may intentionally keep network interface 220 disconnected from the Internet or other network that can be used to communicate with the television service provider. The primary communication channel may be via satellite (which may be unidirectional to the television receiver) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to EPG database 230, other non-video/audio data 231, DVR database 245, and/or on-demand programming 227. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored of television programs recorded due to provider-defined timers.

Location management data 246 may contain information used by location calculation engine 211 to determine the location of television receiver 200. Location management data 246 may include information about the location in orbit of television distribution satellites. (While such satellites may be in geosynchronous orbit, each satellite's location may vary over time, such as by moving within an orbit window.) Timing synchronization offset information may be stored by location management data 246. Further, location management data 246 may contain data indicative of actions for television receiver 200 to perform if television receiver 200 is determined to be outside a predefined threshold distance from a location associated with the subscription account associated with television receiver 200. Location management data 246 may be updated via information received via one or more of tuners 215 via the television distribution satellites. Location management data 246 may include information about spot beams expected to be received in particular regions. Such spot beam information may be used to refine a location by location calculation engine 211. Further, location management data 246 may include signal strength information about spot beams. By comparing the received signal strength of a spot beam with the signal strength of another received signal, the location within a spot beam may be further refined.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. EPG database 230 may serve as an interface for a user to control DVR functions of television receiver 200, and/or to enable viewing and/or recording of multiple television channels simultaneously.

The network information table (NIT) 240 may store information used by television receiver 200 to access various television channels. NIT 240 may be stored locally by a processor, such as tuning management processor 210-2 and/or by storage medium 225. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers (which may be used to ensure different satellites are tuned to for reception of timing signals), frequency identifiers and/or transponder identifiers for various television channels. In some embodiments, NIT 240 may contain additional data or additional tables may be stored by the television receiver. For example, while specific audio PIDs and video PIDs may not be present in NIT 240, a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs, and/or video PIDs. A PMT stores data on ECM (entitlement control message) PIDs for television channels that are transmitted on a transponder frequency.

Table 1 provides a simplified example of NIT 240 for several television channels. It should be understood that in other embodiments, many more television channels may be represented in NIT 240. NIT 240 may be periodically updated by a television service provider. As such, television channels may be reassigned to different satellites and/or transponders, and television receiver 200 may be able to handle this reassignment as long as NIT 240 is updated.

TABLE 1

| Channel | Satellite | Transponder |
|---------|-----------|-------------|
| 4 | 1 | 2 |
| 5 | 2 | 11 |
| 7 | 2 | 3 |
| 13 | 2 | 4 |

Based on information in the NIT, it may be possible to determine the proper satellite and transponder to which to tune for a particular television channel or for ensuring timing signals are received from different satellites. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

It should be understood that the values provided in Table 1 are for example purposes only. Actual values, including how satellites and transponders are identified, may vary. Additional information may also be stored in NIT 240.

While a large portion of storage space of storage medium 225 is devoted to storage of television programming, a portion may be devoted to storage of non-audio/video data, such as EPG database 230 and other non-video/audio data 231. This "other" data may permit television receiver 200 to function properly. In some embodiments, at least ten gigabytes are allocated to such other data. For example, if NIT 240 is stored by storage medium 225, it may be part of other non-video/audio data 231.

Audio/video decoder 233 may serve to convert encoded video and audio into a format suitable for output to a display device. For instance, audio/video decoder 233 may receive MPEG video and audio from storage medium 225 or descrambling engine 265 to be output to a television. MPEG video and audio from storage medium 224 may have been recorded to DVR database 245 as part of a previously-recorded television program. Audio/video decoder 233 may convert the MPEG video and audio into a format appropriate to be displayed by a television or other form of display device and audio into a format appropriate to be output from speakers, respectively.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 227 and/or information from EPG database 230) to a television for presentation.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, referring to satellite television distribution system 100 of FIG. 1, in a satellite-based television service provider system, data necessary to create the provider-defined timers at television receiver 150 may be received via satellite.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 225 for provider-managed television programming storage.

On-demand programming 227 may represent additional television programming stored by storage medium 225. On-demand programming 227 may include television programming that was not recorded to storage medium 225 via a timer (either user- or provider-defined). Rather, on-demand programming is programming provided to the television receiver directly for storage by the television receiver and for later presentation to one or more users. On-demand programming 227 may not be user-selected. As such, the television programming stored to on-demand programming storage 227 may be the same for each television receiver of a television service provider.

User interface 250 may include a remote control (physically separate from television receiver 200) and/or one or more buttons on television receiver 200 that allow a user to interact with television receiver 200. User interface 250 may be used to select a television channel for viewing, view information from EPG database 230, and/or program a timer stored to DVR database 245, wherein the timer is used to control the DVR functionality of control processor 210-1.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with particular television channel. Particular data packets, referred to as entitlement control messages (ECMs), may be periodically transmitted. ECMs may be associated with another PID and may be encrypted; television receiver 200 may use decryption engine 261 of smart card 260 to decrypt ECMs. Decryption of an ECM may only be possible if the user has authorization to access the particular television channel associated with the ECM. When an ECM is determined to correspond to a television channel being stored and/or displayed, the ECM may be provided to smart card 260 for decryption.

When smart card 260 receives an encrypted ECM, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260. Smart card 260 may be permanently part of television receiver 200 or may be configured to be inserted and removed from television receiver 200.

Smart card 260 may also store location data 262. Location data 262 may be coordinates (e.g., latitude and longitude) of an address corresponding to a subscription account with which smart card 260 (and television receiver 200) is associated. For instance, location data 262 may indicate the location at which a subscriber informed the television service provider that the television receiver would be used. Location data 262 may be encoded onto smart card 260 before smart card 260 is provided to the subscriber for use at the subscriber's household (or other subscription location). In other embodiments, location data 262 may be received via a tuner of tuners 215 via satellite or via network interface 220. For instance, if the subscriber moves and informs the television service provider, the address or coordinates associated with the subscriber that is stored by smart card 260 may be updated. In some embodiments, rather than location data 262 being stored by smart card 260, location data 262 may be stored by storage medium 225 or some other storage device of television receiver 200.

Tuning management processor 210-2 may be in communication with tuners 215 and control processor 210-1. Tuning management processor 210-2 may be configured to receive commands from control processor 210-1. Such commands may indicate when to start/stop recording a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may include timing measurement engine 256. Timing measurement engine 256 may be configured to determine a difference in time (TDOA values) between when timing signals were received by different tuners of tuners 215. For example, some number of nanoseconds may elapse between when synchronized timing signals from different satellites are received by tuners 215 due to the difference in distance between television receiver 200 and the satellites. Timing measurement engine 256 may record time of arrival (TOA) values (e.g., based on a number of clock ticks measured using a clock of television receiver 200), then determine TDOA values using the TOA values. Each TDOA value may represent the difference between two TOA values from different satellites. For example, three TOA values (from three satellites) may be used to calculate two TDOA values. As another example, two TOA values (from two satellites) may be used to calculate a single TDOA value. It should be understood that some or all of the functionality of timing measurement engine 256 may be performed by a processing device other than tuning management processor 210-2, such as control processor 210-1. It should be understood that processors 210 may receive a clock signal from one or more clocks.

Tuning management processor 210-2 may be configured to create one or more PID filters 255 that sort packets received from tuners 215 based on the PIDs. When a tuner is initially tuned to a particular frequency (e.g., to a particular transponder of a satellite), a PID filter may be created based on the PMT data. The PID created, based on the PMT data packets, may be known because it is stored as part of NIT 240 or another table, such as a program association table (PAT). From the PMT data packets, PMT may be constructed by tuning management processor 210-2.

PID filters 255 may be configured to filter data packets based on PIDs. In some embodiments, PID filters 255 are created and executed by tuning management processor 210-2. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets corresponding to a television channel that is not desired to be stored or displayed by the user may be ignored by PID filters 255. As such, only data packets corresponding to the one or more television channels desired to be stored and/or displayed may be filtered and passed to either descrambling engine 265 or smart card 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2. Similar to a PID filter being created for a particular television channel, a PID filter may be created for timing signals for use in determining the location of the television receiver.

Descrambling engine 265 may use the control words output by smart card 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by smart card 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to audio/video decoder 233 for output to a television or other presentation equipment via television interface 235.

External storage device 252 may represent an external, detachable computer-readable non-transitory storage device. The storage device may be memory, a hard drive, or some other type of device for storing computer-readable data. The user may be permitted to connect and disconnect external storage device 252 to increase and decrease an amount of storage space available for storing on-demand programming, service provider-managed television programming, and/or user managed television programming.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Also, while television receiver 200 may be used to receive, store, and present television channels received via a satellite, it should be understood that similar components may be used to receive, store, and present television channels via a cable network.

Figure 3:
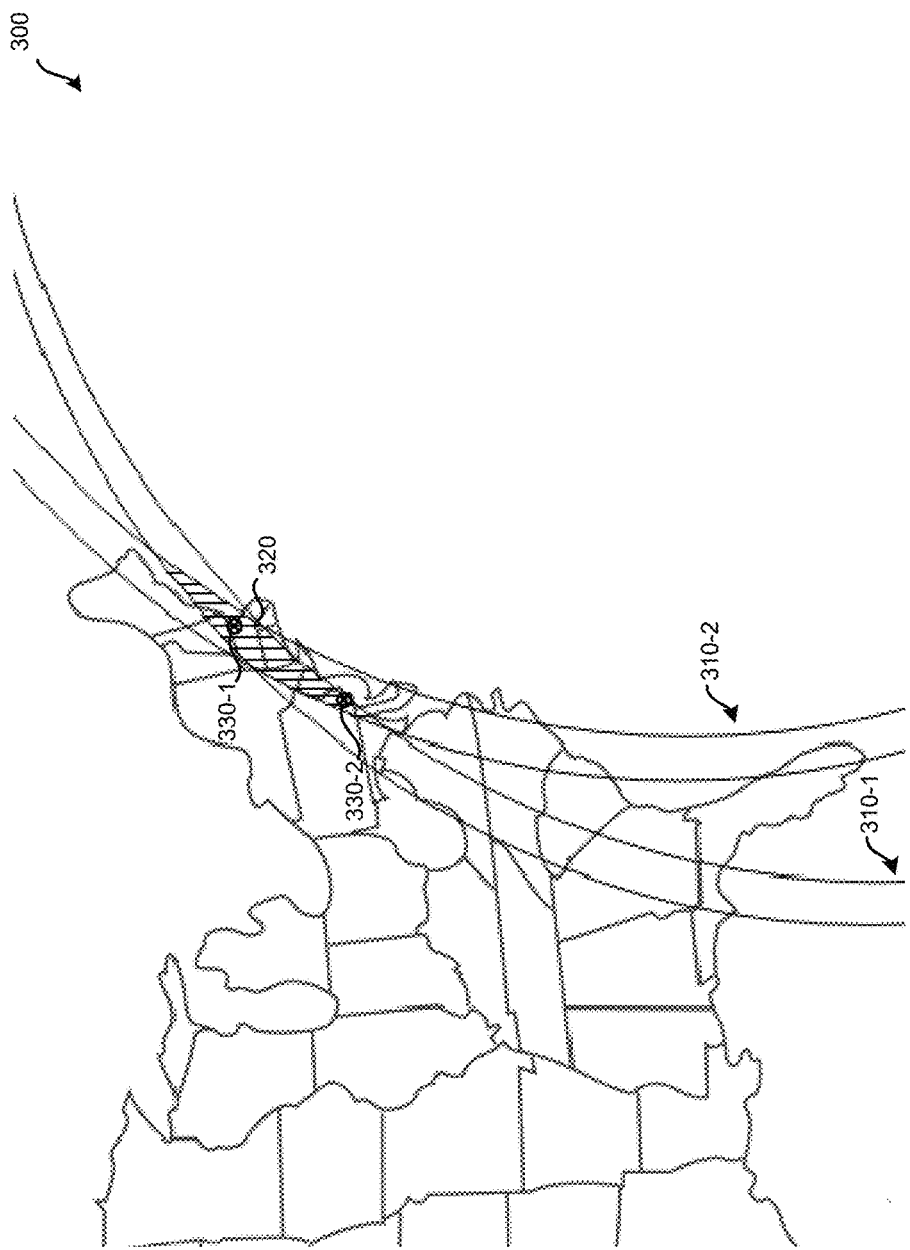
FIG. 3 illustrates an embodiment of a graphical representation of a location determination.

FIG. 3 illustrates an embodiment of a graphical representation 300 of television receivers performing self-location. Graphical representation 300 illustrates two television receivers 330 located on the east coast of the United States. Television receiver 330-1 is located in the greater-Boston area, and television receiver 330-2 is located in the greater-Philadelphia area. These two television receivers and their respective locations are for example purposes only. Television receivers 330 may represent embodiments of television receiver 200 of FIG. 2. Further, television receivers 330 may function as part of a television distribution system, such as satellite television distribution system 100 of FIG. 1. Therefore, television receivers 330 may receive television channels and timing signals from multiple television distribution satellites.

Multiple bands 310 are illustrated. Each band may represent a time difference of arrival (TDOA) value based on TOA values of timing signals from a pair of television distribution satellites. Since a location of the pair of television distribution satellites is stored by the television receiver, the television receiver may be able to determine that it is located within band 310-1. A band may also be thought of as a line or stripe over a geographic area. The width of band 310-1 may be based upon an amount of tolerated or expected timing measurement error. In some embodiments, band 310-1 may be a sufficiently accurate location of the television receiver. For instance, if television receiver 330-1 is tied to a subscription address in Ohio, from only band 310-1 it may be possible to determine that television receiver 330-1 is not located at the subscription address. Therefore, a single TDOA value may be used to determine an accurate enough location of the television receiver.

The television receiver may be able to determine that it is located within band 310-2 by measuring a TDOA value for a different pair of television distribution satellites, the locations of which are also known. This TDOA value may be obtained based on TOA measurements made involving one of the TOA measurements used for the TDOA value of band 310-1 or from an exclusive pair of TOA measurements. The width of band 310-2 may be based on an amount of tolerated or expected measurement error. The geographic region in which band 310-1 and band 310-2 overlap, represented by location region 320, is where the television receiver is determined to be located. Based upon the measurement error of bands 310, the geographic size of location region 320 may vary considerably. If the television receiver can receive timing signals from additional television distribution satellites, additional bands may be calculated that can be used to refine location region 320. It should be understood that location region 320 is an exemplary simplification and the actual shape of location region 320 may be more complex.

Location region 320, which allows for an amount of measurement error, represents the region where the television receiver is determined to be operating. Location region 320, when considered on a global or national scale, represents a significant restriction on where the television receiver may be operating. However, for example, within location region 320, it may not be possible to determine whether the television receiver is in the Boston area (such as television receiver 330-1) or is in the Philadelphia area (such as television receiver 330-2).

Figure 4:
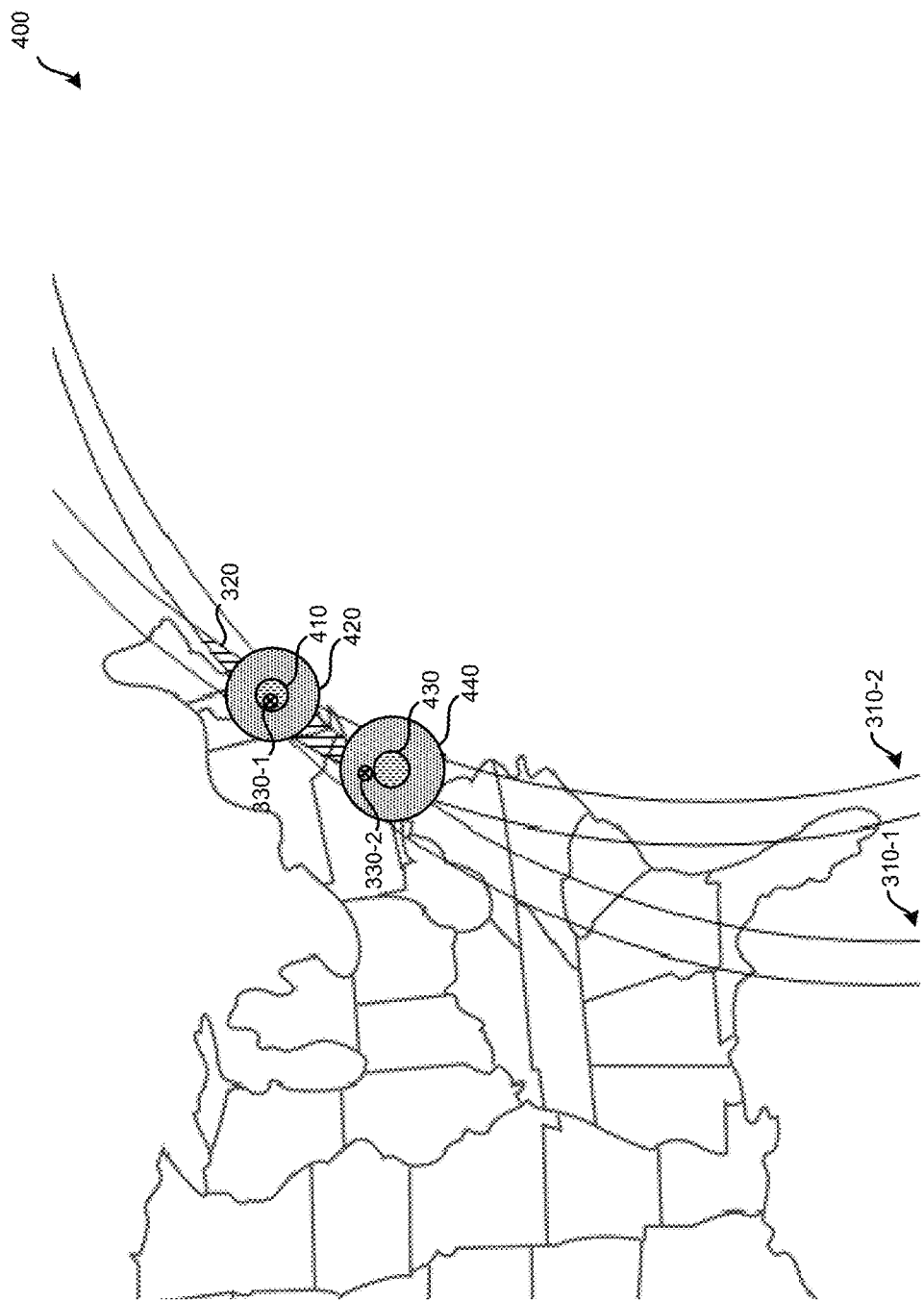
FIG. 4 illustrates another embodiment of a graphical representation of a location determination.

FIG. 4 illustrates another embodiment of a graphical representation 400 of television receivers performing self-location. Graphical representation 400 illustrates two television receivers 330 located on the east coast of the United States as in FIG. 3. Again, these two television receivers and their respective locations are for example purposes only. In FIG. 4, in addition to location region 320 being determined, spot beams are analyzed to further refine where television receivers 330 are located. Alternatively, an opposite arrangement may be present: spot beams are analyzed to determine where a television receiver is generally located, with analyzed timing information being used to refine the location of the television receiver.

A transponder stream containing multiple television channels may be transmitted by a television distribution satellite to a particular television market. For instance, the spot beam producing spot beam coverage area 420 may only be transmitted to the Boston area by a television distribution satellite. The spot beam producing spot beam coverage area 440, which may be transmitted by the same or a different television distribution satellite at the same or a different frequency, may only be transmitted to the Philadelphia area. These spot beams may be used to refine where within location region 320 television receivers 330 are located.

Based upon the data within spot beams associated with spot beam coverage areas 440 and 420, television receivers 330 may be able to determine which spot beam is being received. For instance, data may be present within the transponder stream of each spot beam that identifies the spot beam. Such data may also indicate the geographic region served by the spot beam (or such data may be stored by the television receiver). FIG. 4 illustrates each television receiver receiving a single spot beam; however, it should be understood that each television receiver may receive multiple spot beams, each of which may be used to refine the location of the television receiver. Television receiver 330-1, using location region 320 and spot beam coverage area 420, may determine that it is located in the geographic region where location region 320 and spot beam coverage area 420 intersect. Similarly, television receiver 330-2, using location region 320 and spot beam coverage area 440, may determine that it is located in the geographic region where location region 320 and spot beam coverage area 440 intersect.

In some embodiments, the signal strength of spot beams may be used to further refine the location of television receivers. The signal strength of a spot beam may be compared to the signal strength of another television signal transmitted by the same television distribution satellite. Based on the relative signal strength, it may be possible to further refine where within a spot beam coverage area a television receiver is located. For instance, high signal strength coverage area 410 represents a portion of spot beam coverage area 420 expected to receive high signal strength (e.g., over a threshold value), while the portion of spot beam coverage area 420 outside of high signal strength coverage area 410 represents a portion of spot beam coverage area 420 expected to receive a signal strength below a threshold value. Similarly, high signal strength coverage area 430 represents a portion of spot beam coverage area 440 expected to receive high signal strength (e.g., over a threshold value), while the portion of spot beam coverage area 440 outside of high signal strength coverage area 430 represents a portion of spot beam coverage area 440 expected to receive a signal strength below a threshold value.

If television receiver 330-1 determines it is within high signal strength coverage area 410, the location of television receiver 330-1 within location region 320 may be restricted to only the intersection between location region 320 and high signal strength coverage area 410. If television receiver 330-2 determines it is outside high signal strength coverage area 430 (but within spot beam coverage area 440), the location of television receiver 330-2 within location region 320 may be restricted to only the intersection between location region 320 and spot beam coverage area 440 (exclusive of high signal strength coverage area 430).

FIGS. 3 and 4 are intended to be exemplary only. The scale, width, and shape of bands 310, and alignment of bands 310, may vary significantly from those pictured. For instance, for geosynchronous satellites, a location region may be a band that has a north/south orientation. As such, FIGS. 3 and 4 should not be interpreted as dictating the actual alignment of bands/location regions, size of bands/location regions, shape of bands/location regions, and/or location of satellites.

Figure 5:
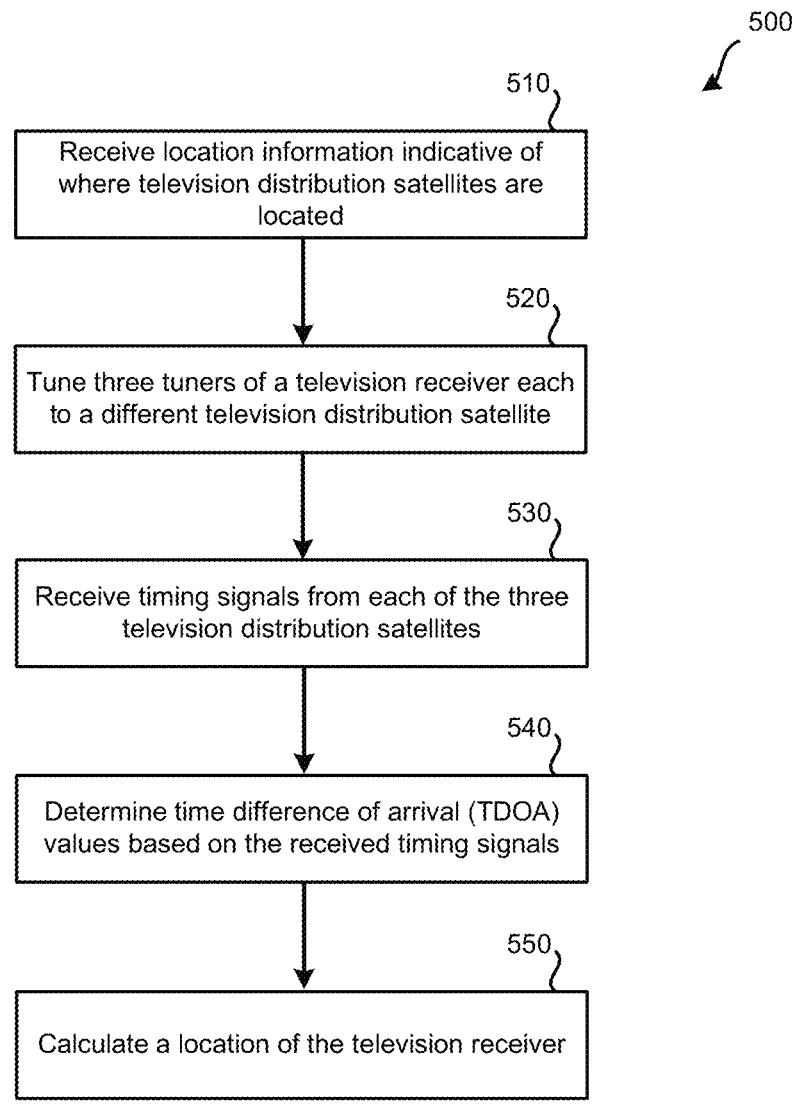
FIG. 5 illustrates an embodiment of a method for a television receiver performing self-location.

Embodiments of the television distribution system of FIG. 1 and the television receiver of FIG. 2 may be used to perform various methods. FIG. 5 illustrates an embodiment of a method 500 for a television receiver performing self-location. Method 500 may be performed using an embodiment of satellite television distribution system 100 of FIG. 1 and an embodiment of television receiver 200 of FIG. 2. For instance, method 500 may be used to determine a location of a television receiver similar to as presented in FIG. 3. Each step of method 500 may be performed by a television receiver. As such, means for performing each step of method 500 include one or more instances of one or more of the components detailed in relation to television receiver 200 of FIG. 2. Further, the television receiver may be computerized. A television receiver may include one or more instances of one or more components of computer system 700 of FIG. 7.

At step 510, a television receiver may receive information indicative of where various television distribution satellites are located in orbit. For example, this location information may indicate where each television distribution satellite with which the television receiver may receive signals is located in geosynchronous orbit. This location information may include a latitude, longitude, and altitude for each television distribution satellite. The location information may be in some form of coordinates other than latitude, longitude, and altitude. This location information may be stored by the television receiver. Further, this location information may be initially provided to and/or updated at the television receiver via one or more of the television distribution satellites. This location information may be periodically updated as the orbits of one or more of the television distribution satellites vary.

At step 520, two or more tuners of the television receiver may each be tuned to a different television distribution satellite. The television receiver may have received information indicative of which satellites should be tuned to receive timing information for location determination. In some embodiments, a television receiver may consult a table stored by the television receiver, such as an NIT, to determine two or more transponders that are located on two or more different satellites. In some embodiments, rather than using three tuners of the television receiver to tune to transponder streams of three different television distribution satellites, only two tuners of the television receiver may be used. In such embodiments, the two tuners may be used to tune to a first pair of television distribution satellites. Subsequently, the two tuners may be used to tune to a second pair of television distribution satellites that includes at least one different television distribution satellite to receive timing signals. As such, regardless of whether two, three, or more than three tuners are used, at minimum, sufficient data to compute a single TDOA values (to obtain a geographic stripe) may be obtained.

At step 530, timing signals may be received by the television receiver from each of the (at least) two television distribution satellites. The timing signals received at step 530 may have been broadcast synchronized by the television service provider. By the timing signals being synchronized, this may mean that each of the timing signals was broadcast by the television distribution satellites at a same time (or, as close to a same time as possible). In some embodiments, the timing signals may be transmitted by the television distribution signals at different times, but may be considered synchronized because the television receiver has information indicative of the timing offset that indicates the difference in time between when the timing signals were transmitted by each of the television distribution satellites. Measurement of the timing signals at step 530 may be performed by the television receiver by recording a timing measurement, such as a clock tick count, that is indicative of when the timing signal was received by the television receiver. This timing measurement may be referred to as a time of arrival (TOA) measurement.

The timing signals received at step 530 may be dedicated timing signals used for location determination, with the timing signals being embedded in transponder streams containing television programming (and/or other television content). In some embodiments, rather than having dedicated timing signals, a synchronized portion of the television programming signals transmitted via multiple television distribution satellites may be synchronized for use as timing signals.

At step 540, a time difference of arrival (TDOA) value may be calculated using the TOA measurements obtained at step 530. To obtain a TDOA value, the difference between two TOA measurements may be calculated. Therefore, if three TOA measurements were obtained at step 530, two TDOA values can be calculated at step 540; if two TOA measurements were obtained at step 530, one TDOA value can be calculated at step 540. Each of the TDOA values calculated at step 540 may be associated with a pair of television distribution satellites. Following step 540, at least one TDOA value may be calculated, with each calculated TDOA value being associated with a pair of television distribution satellites having known locations.

At step 550, the location of the television receiver may be calculated using the TDOA values calculated at step 540 and the known location of the television distribution satellites from which the timing signals were received. Calculation of the location of step 550 may involve factoring in an amount of error. As such, rather than a specific location or address being determined based on the location calculated at step 550, a geographic region may be determined, similar to location region 320 of FIG. 3. The size of the location region calculated at step 550 may be at least partially based on the amount of error in the measurement of the timing signals received at step 530 and an amount of error present in the synchronizing broadcast of the timing signals by the television distribution satellites. The error in calculating the location at step 550 may be also at least partially influenced by the signal path from the multiple television distribution satellites being fairly similar (for example, all of the television distribution satellites may be in a geosynchronous orbit). Following step 550, the television receiver may have determined its own location (or location region) without requiring any form of network connectivity besides receiving signals from multiple television distribution satellites. This location determined by the television receiver may be used for multiple purposes, including ensuring that the television receiver is located in the vicinity of an address associated with a subscription with the television service provider.

Since a television receiver is expected to be stationary, it may be possible to tolerate significant noise in positioning signals. By averaging out multiple determined locations of the television receiver, the amount of uncertainty in the location of the television receiver may be decreased. For example, 50 locations of a television receiver may be averaged together by the television receiver to determine a likely more accurate average location.

Figure 6:
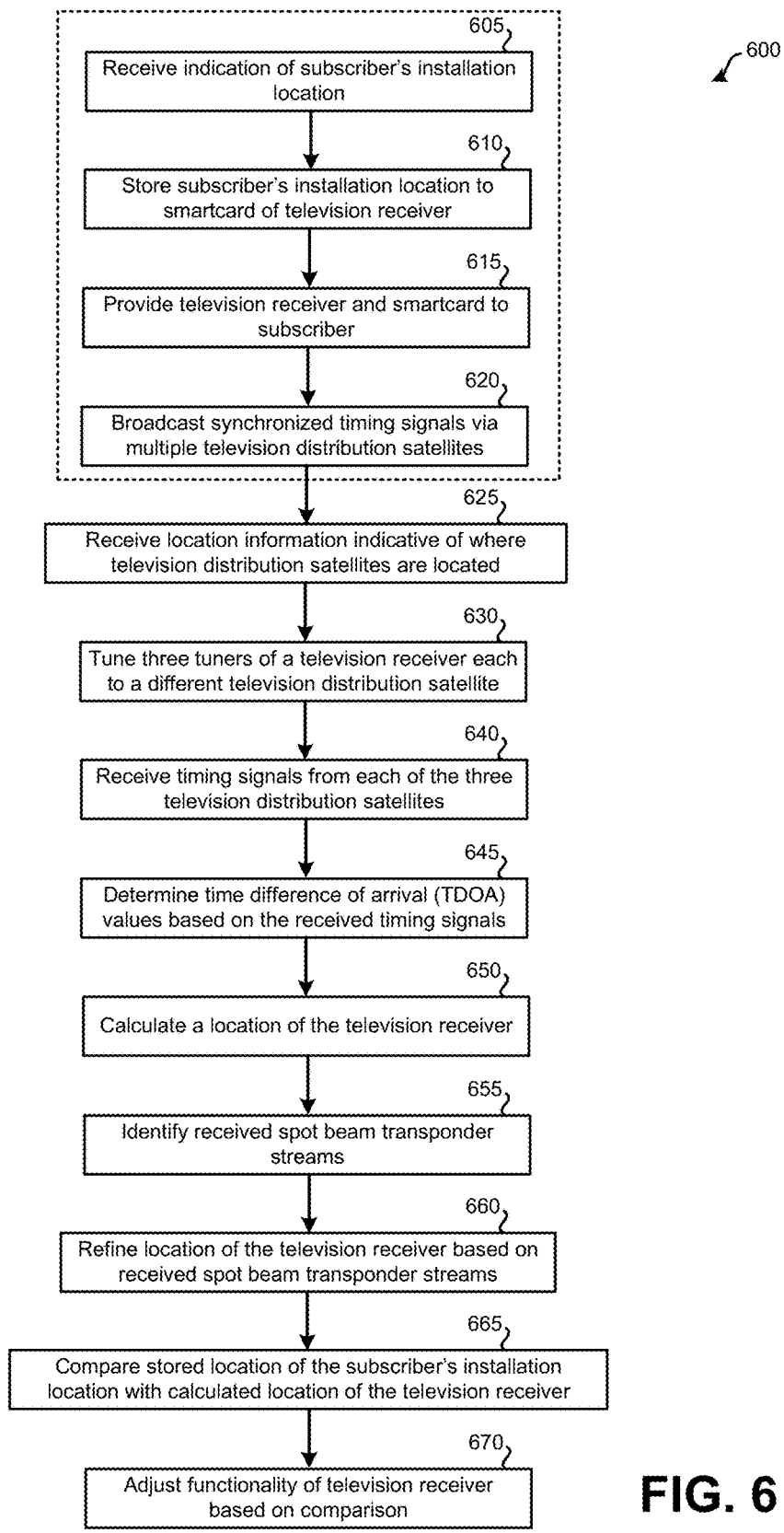
FIG. 6 illustrates an embodiment of a method for controlling access to content based on a television receiver performing self-location.

FIG. 6 illustrates an embodiment of a method 600 for controlling access to content based on a television receiver performing self-location. Method 600 may be performed using an embodiment of satellite television distribution system 100 of FIG. 1 and an embodiment of television receiver 200 of FIG. 2. For instance, method 600 may be used to determine a location of a television receiver similar to as presented in FIG. 3. Each step of method 600 may be performed by a television receiver unless otherwise noted. As such, means for performing each step of method 600 include one or more instances of one or more of the components detailed in relation to television receiver 200 of FIG. 2. Further, the television receiver may be computerized. A television receiver may include one or more instances of one or more components of computer system 700 of FIG. 7. Method 600 may represent a more detailed embodiment of method 500 of FIG. 5.

Steps 605 through 620 may be performed by a television service provider. For example, referring to satellite television distribution system 100 of FIG. 1, steps 605 through 620 may be performed using television service provider system 110. At step 605, an indication of a subscriber's installation location may be received by the television service provider. When a subscriber decides to initially sign up for a satellite television service, the subscriber may be required to provide an address at which television service is desired. This address may be stored in association with an account of the subscriber maintained by the television service provider. According to a service contract between the television service provider and the subscriber, all television receivers used by (and possibly provided to) the subscriber for use in association with the account may be required to be installed at the provided address. At step 610, this installation address (or location/region associated with the installation address) may be stored to one or more smartcards that are or will be installed in one or more television receivers that are to be used at the address indicated at step 605. In some embodiments, the one or more smartcards may be so encoded before the smartcards are provided to the subscriber. Alternatively, the encoding may occur after the subscriber has installed the television receiver. In such embodiments, the data to encode the smartcard with the address may be transmitted via a television distribution satellite (which may be one of the satellites that transmits timing signals) to the television receiver. In some embodiments, rather than the address being stored to the smartcard, the address may be stored to another non-transitory computer-readable storage medium of the one or more television receivers. At step 615, in some embodiments, the television receiver and smartcard may be provided to the subscriber for installation. For instance, the television receiver and smartcard may be shipped to the subscriber, who may be responsible for installing the television receiver and any other associated user equipment himself.

At step 620, the television service provider may broadcast synchronized timing signals using multiple (e.g., at least two) television distribution satellites. The transmission of the timing signals may be staggered based on the distance to the satellites such that each satellite will broadcast the timing signals at a same time. In some embodiments, one or more timing offset values are provided to the television receivers (e.g., via the television distribution satellites) that indicate a timing offset between the broadcast of the timing signals by the television distribution satellites. As previously detailed, timing signals that are broadcast may be signals specifically for use as timing signals or may be signals that are used to provide television programming to television receivers. The timing signals may be part of transponder streams that are used to deliver television programming to television receivers. As such, a transponder stream that contains multiplexed packets for one or more television channels may also include timing signals. Timing signals may be transmitted periodically, such as every second, every minute or every five minutes; other frequencies are possible.

At step 625, a television receiver may receive information indicative of where various television distribution satellites are located in orbit. Such information may also be initially installed on the television receiver before it is provided to the subscriber at step 615. This location information may be initially provided to and/or updated at the television receiver via one or more of the television distribution satellites. This location information may be periodically updated as the orbits of one or more of the television distribution satellites vary.

At step 630, two or more tuners of the television receiver may each be tuned to a different television distribution satellite. The television receiver may have received information indicative of which satellites should be tuned to receive timing information for location determination. In some embodiments, a television receiver may consult a table stored by the television receiver, such as an NIT, to determine two or more transponders that are located on two or more different satellites. In some embodiments, rather than using three tuners of the television receiver to tune to transponder streams of three different television distribution satellites, only two tuners of the television receiver may be used. In such embodiments, the two tuners may be used to tune to a first pair of television distribution satellites. Additionally, the two tuners may be used to tune to a second pair of television distribution satellites that includes at least one different television distribution satellite to receive timing signals to further refine the location of the television receiver. As such, regardless of whether two, three, or more than three tuners are used, at minimum, sufficient data to compute a single TDOA value may be obtained.

At step 640, timing signals may be received by the television receiver from each of the (at least) two television distribution satellites. These timing signals received are the timing signals that are broadcast periodically at step 620. Measurement of the timing signals at step 640 may be performed by the television receiver by recording a TOA measurement, such as a clock tick count, that is indicative of when the timing signal was received by the television receiver.

At step 645, a time difference of arrival (TDOA) value may be calculated using the TOA measurements obtained at step 640. To obtain a TDOA value, the difference between two TOA measurements may be calculated. Therefore, if three TOA measurements were obtained at step 640, two TDOA values can be calculated at step 645; and if two TOA measurements were obtained at step 640, one TDOA value can be calculated at step 645. Each of the TDOA values calculated at step 645 may be associated with a particular pair of television distribution satellites. Following step 645, one or more TDOA values may be calculated, with each calculated TDOA value being associated with a pair of television distribution satellites having known locations.

At step 650, the location of the television receiver may be calculated using the TDOA values calculated at step 645 and the known location of the television distribution satellites from which the timing signals were received. Calculation of the location of step 650 may involve factoring in an amount of error. As such, rather than a specific location or address being determined based on the location calculated at step 650, a geographic region may be determined, similar to location region 320 of FIG. 3. The size of the location region calculated at step 650 may be at least partially based on the amount of error in measurement of the timing signals received at step 640 and an amount of error present in synchronizing broadcast of the timing signals by the television distribution satellites. The error in calculating the location at step 650 may be also at least partially influenced by the signal path from the multiple television distribution satellites being fairly similar (for example, all of the television distribution satellites may be in a geosynchronous orbit). If a single TDOA value is used, the television receiver may be known to be within a determined stripe, such as band 310-1 of FIG. 3A. If multiple TDOA values were determined, a more precise geographic location may be known, such as location region 320. Following step 650, the television receiver may have determined its own location (or location region) without requiring any form of network connectivity besides receiving signals from multiple television distribution satellites.

In some embodiments, spot beams may be used to refine the location of the television receiver. At step 655, one or more spot beams that are being received by the television receiver may be identified. Each spot beam may have an identifier associated with it. Alternatively, each television channel that is transmitted as part of the spot beam may have an identifier associated with it (which can be used to determine which spot beam is being received). Further, the signal strength of the spot beam, possibly as compared to other received signals (such as a transponder stream that is not transmitted as part of a transponder stream) may be determined. At step 660, the location region of the television receiver may be refined based on determining which spot beams can be received and/or the signal strength of the spot beam, such as illustrated in relation to FIG. 4.

At step 665, the stored location of the subscriber's installation location may be compared with the location of the television receiver determined at step 650 or step 660. The stored location may be determined to match the calculated location if within a predefined distance, such as 1, 5, 10, 20, 30, or 50 miles. In some embodiments, the calculated location may be indicative of a location region. If the stored location is within the location region or is within a predefined distance of the location region, the locations may be considered to match. Otherwise, the stored location may be considered to not match the calculated location.

At step 670, functionality of the television receiver may be at least partially based on the comparison of step 665. If the locations match, the television receiver may function as expected. If the locations do not match, the television receiver may have its functionality reduced. For instance, a pop-up (or other form of displayed message) may be displayed at power on or periodically (possibly such that viewing content is negatively affected). This message may require the subscriber to contact the television service provider (e.g., via phone). A representative of the television service provider may then question the subscriber to determine if the subscription is valid or not. If valid, a message may be sent to the television receiver via a television distribution satellite that causes the pop-up message to no longer be displayed and for the television receiver to function as expected. If invalid, a message may be sent to the television receiver via the television distribution satellite that causes some or all of the functionality of the television receiver to be disabled. If the subscriber does not respond to the pop-up message by contacting the television service provider after a predefined period of time, the television receiver may be partially or fully disabled.

Figure 7:
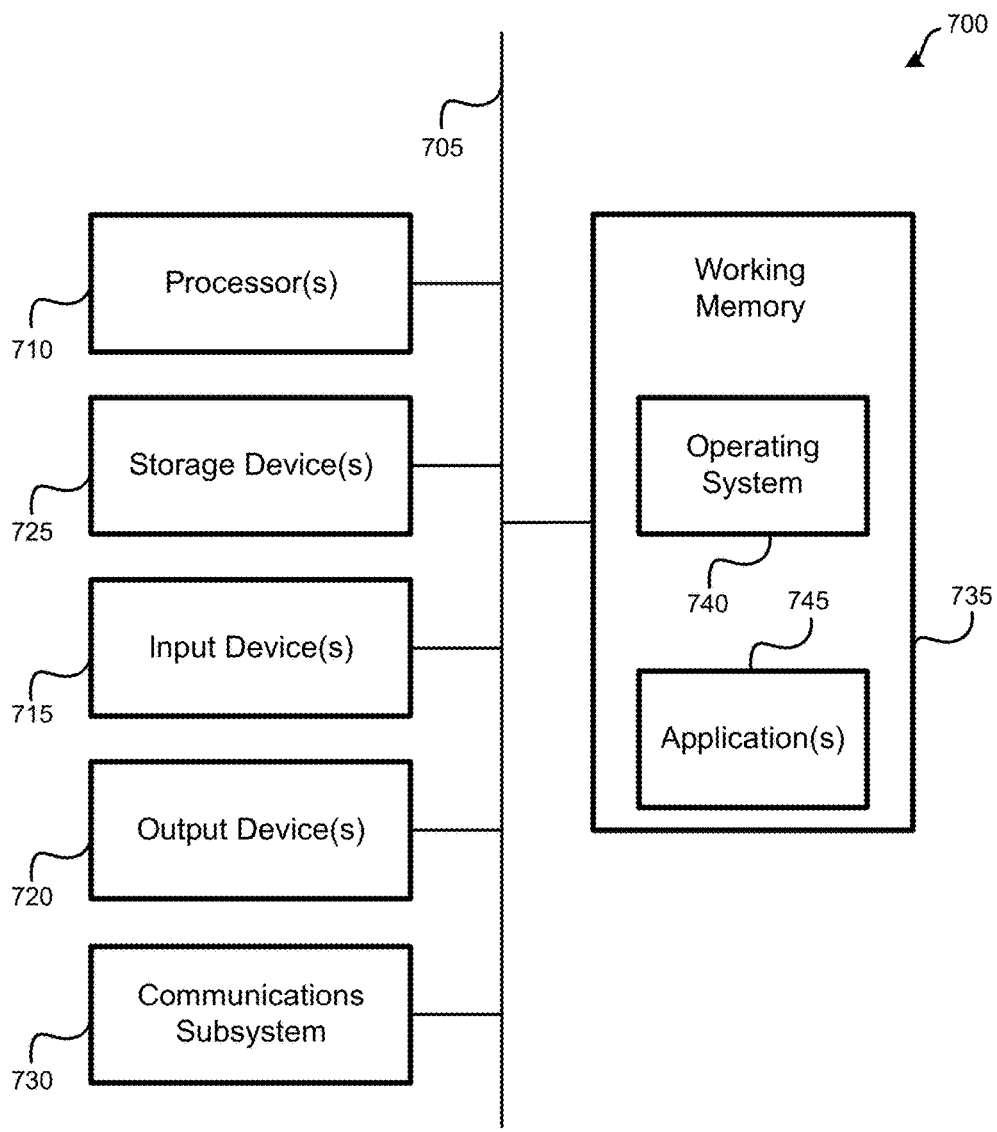
FIG. 7 illustrates an embodiment of a computer system.

FIG. 7 illustrates an embodiment of a computer system 700. A computer system as illustrated in FIG. 7 may be incorporated as part of the previously described computerized devices, such as a television receiver, television distribution satellite, and/or television service provider system. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a keyboard, remote control, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/ or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A television receiver comprising:
a plurality of tuners comprising a first tuner and a second tuner;
one or more processors;
a memory communicatively coupled with and readable by the one or more processors and having stored therein processor-readable instructions which, when executed by the one or more processors, cause the one or more processors to:
tune the first tuner of the plurality of tuners to receive a first television channel transponder stream from a first television distribution satellite of a plurality of television distribution satellites;
tune the second tuner of the plurality of tuners to receive a second television channel transponder stream from a second television distribution satellite of the plurality of television distribution satellites, wherein:
the second tuner is tuned to the second television channel transponder stream while the first tuner is tuned to the first television channel transponder stream;
determine a location region of the television receiver using the first television channel transponder stream and the second television channel transponder stream;
compare the location region of the television receiver to an approved locally-stored location of the television receiver, the locally-stored location being stored by the television receiver;
determine that the location region of the television receiver does not match the approved locally-stored location of the television receiver to within a threshold distance; and
modify functionality of the television receiver to output television channels in response to determining that the location region of the television receiver does not match the approved locally-stored location of the television receiver to within the threshold distance.

2. The television receiver of claim 1, the television receiver further comprising:
a smartcard reader, wherein the memory further comprises processor-readable instructions, which, when executed by the one or more processors, cause the one or more processors to:
retrieve the approved location of the television receiver from a smartcard installed within the smartcard reader.

3. The television receiver of claim 1, wherein the memory further comprises processor-readable instructions, which, when executed by the one or more processors, cause the one or more processors to:
output for presentation a message that obscures television programing in response to determining the location region of the television receiver does not match the approved locally-stored location of the television receiver to within the threshold distance.

4. The television receiver of claim 1, wherein the processor-readable instructions which, when executed by the one or more processors, further cause the one or more processors to:
tune a third tuner of the plurality of tuners to receive a third television channel transponder stream from a third television distribution satellite of the plurality of television distribution satellites, wherein the third tuner is tuned to the third television channel transponder stream simultaneously with the first tuner being tuned to the first television channel transponder stream and the second tuner being tuned to the second television channel transponder stream, wherein the location region is further calculated using the third television channel transponder stream.

5. A method for a television receiver to perform self-location, the method comprising:
tuning, by the television receiver, the first tuner of the plurality of tuners to receive a first television channel transponder stream from a first television distribution satellite of a plurality of television distribution satellites;
tuning, by the television receiver, the second tuner of the plurality of tuners to receive a second television channel transponder stream from a second television distribution satellite of the plurality of television distribution satellites, wherein:
the second tuner is tuned to the second television channel transponder stream while the first tuner is tuned to the first television channel transponder stream;
determining, by the television receiver, a location region of the television receiver using the first television channel transponder stream and the second television channel transponder stream;
comparing, by the television receiver, the location region of the television receiver to a locally-stored approved location of the television receiver
determining, by the television receiver, that the location region of the television receiver does not match the locally-stored approved location of the television receiver to within a threshold distance; and
modifying, by the television receiver, functionality of the television receiver to output television channels in response to determining the location region of the television receiver does not match the locally-stored approved location of the television receiver to within the threshold distance.

6. The method of claim 5, further comprising:
retrieving, by the television receiver, the approved location of the television receiver from a smartcard installed within a smartcard reader of the television receiver.

7. The method of claim 5, further comprising:
outputting, by the television receiver, for presentation a message that obscures television programing in response to determining the calculated location region of the television receiver does not match the approved location of the television receiver to within the threshold distance.

8. The method of claim 5, further comprising:
tuning, by the television receiver, a third tuner of the plurality of tuners to receive a third television channel transponder stream from a third television distribution satellite of the plurality of television distribution satellites, wherein the third tuner is tuned to the third television channel transponder stream simultaneously with the first tuner being tuned to the first television channel transponder stream and the second tuner being tuned to the second television channel transponder stream, wherein the location region is further calculated using the third television channel transponder stream.

9. A non-transitory processor-readable medium for performing self-location of a television receiver, comprising processor-readable instructions configured to cause one or more processors to:
tune the first tuner of the plurality of tuners to receive a first television channel transponder stream from a first television distribution satellite of a plurality of television distribution satellites;
tune the second tuner of the plurality of tuners to receive a second television channel transponder stream from a second television distribution satellite of the plurality of television distribution satellites, wherein:
the second tuner is tuned to the second television channel transponder stream while the first tuner is tuned to the first television channel transponder stream;
determine a location region of the television receiver using the first television channel transponder stream and the second television channel transponder stream;
compare the location region of the television receiver to a locally-stored approved location of the television receiver;
determine that the location region of the television receiver does not match the locally-stored approved location of the television receiver to within a threshold distance; and
modify functionality of the television receiver to output television channels in response to determining the location region of the television receiver does not match the locally-stored approved location of the television receiver to within the threshold distance.

* * * * *